Jan. 7, 1969  W. R. HOFFMEYER  3,421,033
SINGLE-PHASE INDUCTION ELECTRIC MOTOR
Filed June 7, 1966
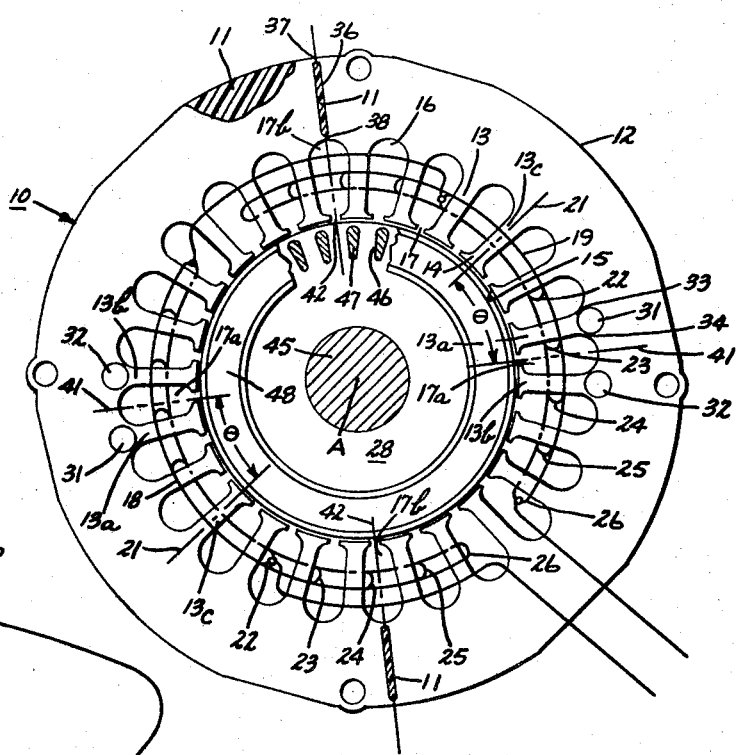
Fig.1
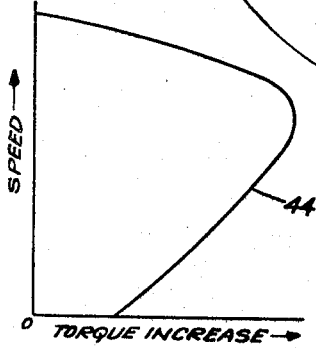
Fig.2
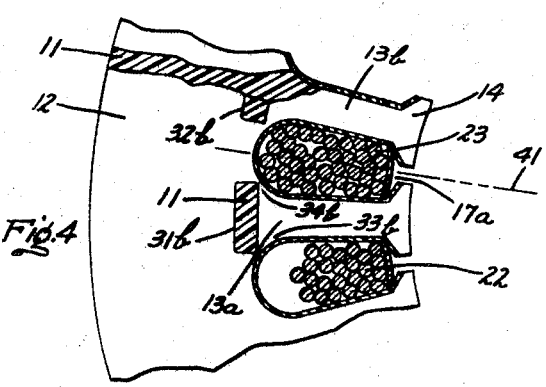
Fig.3
Fig.4
INVENTOR.
William R. Hoffmeyer,
BY John M. Stoudt
Attorney.

United States Patent Office 3,421,033
Patented Jan. 7, 1969

3,421,033
SINGLE-PHASE INDUCTION ELECTRIC MOTOR
William R. Hoffmeyer, Holland, Mich., assignor to General Electric Company, a corporation of New York
Filed June 7, 1966, Ser. No. 555,731
U.S. Cl. 310—172
Int. Cl. H02k 17/10
6 Claims The present invention relates to single-phase induction type electric motors and more particularly to a stator for use in such motors which achieves starting and running operation without utilization of an auxiliary winding.

One of the most well-known single-phase induction type electric motors in commercial use today is the split-phase motor having two separate and distinct windings conventionally carried by a laminated stator core. These windings are commonly referred to as main and auxiliary distributed windings which are of different impedances and have coil groups spaced ninety electrical degrees apart. Although split-phase motors are basically simple, rugged, and economical in design, in the past, a number of attempts have been made to enhance these qualities by eliminating the need for the auxiliary winding, such past attempts having either contemplated a distortion of the main winding or of the bore or both.

In particular, in one suggested approach, rather than providing a main winding with coil groups arranged symmetrically about a coil group axis having coil deployment and turns chosen to furnish the highly desirable generally sinusoidal ampere-turn pattern, the coils are arranged asymmetrical. This, in turn, requires substantial modification to existing winding equipment to wind and install such winding, which adds to the over-all manufacture, if such machines can be modified at all to provide these functions. In addition, it has been suggested that the magnetic path at the bore under each pole be distorted. This, however, tends to produce space harmonics for certain flux components which detrimentally affect the torque characteristics of the motor and contribute to an unbalance in over-all performance, considering both starting and running operation.

Consequently, it is the primary object of the present invention to provide an improved stator for use in single-phase induction type electric motors which does not utilize an auxiliary winding, and it is a more specific object to provide such a stator which overcomes the undesirable features and difficulties mentioned above.

It is another object of the present invention to provide an inexpensive and simple stator having a wound distributed main winding in which neither the winding nor stator bore is distorted and permits use of existing stator fabricating equipment and techniques.

In carrying out the objects in one form, I provide an improved stator for use in a single-phase induction type electric motor which obviates the need for an auxiliary winding. The stator includes a magnetizable core in which a number of spaced apart teeth sections are joined at one end to a yoke section and have terminations at the other end defining a generally cylindrical shaped bore for receiving a rotatable member. The core sections together furnish a plurality of coil accommodating slots which carry at least two coil groups having coils spanning a number of teeth sections and being symmetrically disposed about a central core group axis. At least one preselected tooth section in each spanned number is located in the region of a quadrature axis where the stator has minimum permeance disposed at an electrical angle θ from the coil group axis in the direction opposite to planned direction of rotation. The preselected tooth section includes magnetic restriction means intermediate its termination and the yoke section, preferably reducing the magnetic path at that location by at least 50% of the average width of the preselected tooth section. This structure produces a reluctance in the path of a component of flux (e.g., quadrature axis) at that location. If desired, the yoke section may be provided with a magnetic restriction in the magnetic path of the quadrature axis flux in the vicinity of the direct axis approximately ninety electrical degrees away from the quadrature axis.

As a result of this construction, a phase shift is accomplished between the flux components and need for the auxiliary winding obviated. In addition, while economies are provided in the mass production manufacture of the stator constructed in accordance with my invention, distortion of either the main winding coil groups or magnetic path at the bore is not required. Moreover, the starting and running performance of the motor is enhanced.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings in which.

In the drawings:

FIGURE 1 is an end elevational view of stator and rotatable members, shown partially broken away and partially in diagram, illustrating one form of the present invention incorporated in a two pole, single-phase induction electric motor having a single distributed type winding;

FIGURE 2 is a representative speed-torque curve for motors incorporating the present invention;

FIGURE 3 is an enlarged fragmentary view, partly in section, of part of a stator showing a modified form of magnetic restrictions disposed between the tooth section terminations and stator yoke section at the desired electrical angle for the type of motor shown in FIGURE 1; and FIGURE 4 is an enlarged fragmentary view of a part of the stator core for the motor of FIGURE 1, revealing another modified form of magnetic restrictions furnished at the desired electrical angle.

Referring now to the drawing in more detail and in particular to FIGURE 1, one form of the present invention has been illustrated as being incorporated in a two pole, single-phase induction type electric motor, generally indicated by numeral 10. In the exemplification, the motor has a stator which includes a laminated core formed of a suitable stack of laminations composed of magnetizable iron or electrical steel material fastened together as by hardened bonding material 11 such as that taught in the Sawyer Patent 2,057,503. The core has a magnetizable yoke section 12 and a plurality of inwardly projecting, angularly spaced apart, teeth sections 13 which are integrally joined at one end to the yoke section and at the other end have terminal lip portions or terminations 14 defining a rotor receiving bore 15. Sections 12 and 13 together form a plurality of coil accommodating slots 16. Adjacent lip portions formed between them equally spaced apart slot entrances 17 which provide communication between the slots 16 and the bore 15. As shown in FIGURE 1, the shape and number of slots 16 are conventional for two pole stators in commercial use today, that is, the slots are radial and twenty-four in number.

In the present exemplification, the distributed main field winding has two coil groups 18, 19 each carried by slots 16, 180 electrical degrees apart, the coils in each group being symmetrically about coil group axis 21. In the illustrated embodiment, there are five concentric coils 22, 23, 24, 25 and 26 wound of suitable turns of wire for each coil group to approximate the highly desirable sinusoidal ampere-turn pattern. Thus, the coils in each group span three, five, seven, nine and eleven teeth sections respectively to provide two magnetic poles of instantaneous alternate or opposed polarity.

At a preselected electrical angle θ with respect to the coil group axis, the angle being measured from axis 21 in a direction opposite to the rotational direction of a rotatable member (generally indicated by number 28 in FIGURE 1) a magnetic restriction is provided radially between the tooth terminations 14 and the yoke section 12 of at least one preselected tooth section 13a. In the illustrated embodiment of FIGURE 1, the coil group has its coils spanning an odd number of teeth sections and a pair of adjacent teeth sections 13a, 13b each include similar magnetic restrictions. Angle θ is measured at the bore between the center of tooth section 13c at coil group axis to the entrance for slot 17a formed between tooth sections 13a, 13b.

The magnetic restriction illustrated in FIGURE 1 takes the form of two punched out openings or apertures 31, 32 furnished in the path for the flux travelling through these teeth sections between the secondary or rotatable member 28 and the magnetic yoke section 12. These apertures may be readily provided during the punching operation in stamping out the individual laminations for the core. For reasons of structural strength saturating bridges 33, 34 are permitted to remain between apertures 31, 32 and the adjacent coil accommodating slots, the bridges being sufficiently small to saturate rapidly when the motor starts operation yet having adequate strength to properly support the selected teeth sections 13a, 13b in the core. For best results, the combined cross-sectional width of bridges 33, 34 should not exceed 50% of the average cross-sectional width of the individual tooth sections in order to furnish the desired restriction in the magnetic flux path.

It should be noted at this time that a magnetic restriction is formed in the yoke section in association with a coil accommodating slot 17b having an entrance located nineteen electrical degrees away from the entrance of slot 17a. As illustrated, the magnetic restriction comprises an elongated radial slot 36 over 10 mils wide and preferably 30 mils, cut entirely through the core in an axial direction and projecting radially across the yoke section for a major part of its depth. The elongated slot terminates at each end next to magnetic bridges 37, 38 which connect adjacent regions of the yoke section together. Since these bridges are relatively narrow, such as for example, less than a total of 10 mils, they do not provide an effective magnetic path across the yoke section at that location.

For augmenting the strength of the yoke section at the magnetic restriction of the yoke section, it is convenient to provide the same type of bonding material 11 in the elongated slots 36 as is employed between the individual laminations. This material may be introduced into the elongated slots during formation of the core as the individual laminations are held under compression after application of the bonding material 11 in its unhardened state.

With the foregoing arrangement a distinct quadrature axis 41 having minimum permeance or maximum reluctance is provided at angle θ or 37, five electrical degrees from coil group axis 21 and a direct axis 42 having maximum permeance is disposed ninety electrical degrees from the quadrature axis. During starting conditions, the quadrature axis flux will be forced over the magnetic restriction 36 which does not interfere with the direct axis flux. Apertures 31, 32 will not appreciably interfere with the passage of this flux. On the other hand, these apertures function as magnetic restrictions and do change the magnetic flux path for the quadrature axis flux through tooth sections 13a, 13b. This construction thus tends to create a shift in phase between the components in flux and produces starting torque for the motor as well as satisfactory running performance. It has been determined that as a practical matter satisfactory operation is obtained for most applications, considering both starting torque and running performance, when angle θ is in the range from approximately 20 degrees to approximately 70 degrees for a given pole to obtain optimum starting torque for a given size motor, angle θ should be in the neighborhood of 45 electrical degrees.

The following example is given in order to illustrate more clearly how the invention, as described above, has been carried out in actual practice. The signal-phase induction type motor was constructed in accordance with the illustrated embodiment. The main winding was wound of 0.0403 inch copper wire having a resistance of 2.31 ohms. Coils 22–26 inclusive were wound with twenty-five, thirty-six, forty-three, forty-three, and forty-three respectively. Angle θ was 37.5 degrees with apertured tooth sections 13a, 13b being located at 30 degrees and 45 degrees away from axis 21. The laminated core had the following nominal dimensions:

| | Inches |
|---|---|
| Outer diameter | 4.80 |
| Bore diameter | 2.40 |
| Tooth section, 13a, 13b width | 0.141 |
| Radial dimension from rotational center A to wall of slot 17 next to yoke section 12 | 1.80 |
| Size of magnetic restriction 36 | 0.035 x 0.520 |
| Width of bridges 37, 38 | 0.035 |
| Diameter of apertures 31, 32 | 0.183 |
| Width of aperture bridges 33, 34 (each) | 0.035 |
| Axial length of stack | 1.12 |

The rotatable member 28 included a laminated core mounted to shaft 45 and a number of angularly spaced apart conductor slots 46 having cast aluminum conductors 47 electrically joined at each end by continuous end rings 48. The conductor in the rotor was skewed 15 degrees with the end rings each having a cross-section area of 0.025 square inch and a resistance of 2.375 ohms to provide a high resistance secondary squirrel cage winding. During the testing of a number of stators and rotatable members, it was discovered that squirrel cage windings have a skew greater than 17 degrees did not produce a corresponding benefit in performance. Below is a representative tabulation of starting and running operation:

| | | |
|---|---|---|
| Breakdown torque at 2200 r.p.m. | ounce feet | 9.9 |
| Torque at 3000 r.p.m. | do | 7.0 |
| Locked rotor torque | do | 1.5 |
| Full load efficiency | percent | 42.8 |
| Two full load efficiency | do | 51.3 |
| Heat loss (I²R) at full load | watts | 32 |

The speed-torque curve 44 in FIGURE 2 is an accurate presentation of the speed-torque characteristic for the tested motors. The tests showed that, generally speaking, the higher the efficiency, the lower will be the heat loss and the locked rotor torque, with the peak locked rotor torque being exhibited when angle θ approached 45 degrees.

Running performance may be improved by merely lengthening the stack height of the stator core or/and by increasing the wire size of the main winding, with starting torques approximating 25% of breakdown torque. From the foregoing it will be apparent that, among many other benefits, a motor having a stator constructed in accordance with one form of the present invention need not have distorted bore or windings which are detrimental to the torque output of the motor. Further, my invention furnishes satisfactory starting and running operation for many applications with the need for an auxiliary winding being obviated. However, motors having both main and auxiliary windings may incorporate the present invention and derive benefits, such as improved starting torque characteristics. In addition, stator fabricating equipment employed today, such as machines punching out individual laminations, may be used without substantial changes being required and the stators are economical to manufacture.

It will be apparent to those skilled in the art that the principles of the present invention are applicable to constructions having more than two coil groups and two magnetic poles. Further, the number, exact configurations and location of the magnetic restriction means located adjacent the quadrature axis 41 may be varied from that illustrated in FIGURE 1. By way of example, in FIGURE 3 where like parts already discussed are identified by like references, magnetic restrictions 31a and 32a are generally rectangular and elongated in shape, disposed intermediate the tooth terminations 14 of tooth sections 13a, 13b and the connection of these sections to the yoke section 12, in spaced relation to the yoke section. Hardened bonding material 11, such as epoxy resin or the like, fills the restriction apertures to augment the rigidity of the tooth sections under consideration.

In FIGURE 4 the magnetic restrictions 31b, 32b also take the form of generally rectangular shaped elongated slots located at the base of the yoke section such that narrow saturating bridges 33b and 34b are provided somewhat similar to and for the same reasons as bridges 33, 34 in FIGURE 1. Hardened material 11 again fills the restrictions in the same fashion as revealed in FIGURE 3.

It should be apparent to those skilled in the art that while I have shown and described what at present is considered to be the preferred embodiments of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. In a single phase induction electric motor having a rotatable member, a stator comprising a core formed of magnetizable material having a yoke section and having a plurality of spaced apart teeth sections joined to said yoke section to provide a plurality of coil accommodating slots, said teeth sections including terminations remote from said yoke section forming a bore for receiving the rotatable member; and a number of coil groups disposed in the slots, with each coil group spanning a number of teeth sections and having a coil group axis; at least one preselected tooth section in each spanned number having magnetic restriction means in spaced relation to the associated termination thereof; and said preselected tooth section being located in the region of a quadrature axis disposed at a desired electrical angle with respect to the coil group axis in the direction opposite to the rotational direction of the rotatable member.

2. The stator of claim 1 in which each magnetic restriction means comprises an aperture for providing a magnetic path less than 50% of the average cross-section of the preselected tooth section.

3. The stator of claim 1 in which the desired electrical angle is in the range from 20° to and including 70°.

4. The stator of claim 1 in which said yoke section has magnetic restriction means located over a preselected slot spanned by each coil group, said preselected slot being disposed at approximately ninety electrical degrees with respect to each associated quadrature axis.

5. The stator of claim 2 in which the core is laminated and has hardened bonding material between the individual laminations and the apertures have hardened bonding material therein thereby providing structural rigidity to the preselected tooth sections.

6. In a single phase induction electric motor having a member revolvable about a rotational axis, a stator core formed of magnetizable material having a yoke section and having a plurality of spaced apart teeth sections joined to said yoke section to provide a plurality of coil accommodating slots; said teeth sections including terminations remote from said yoke section forming a bore for receiving the rotatable member; a number of coil groups distributed in the slots, with each group having coils symmetrically disposed about a coil group axis and spanning predetermined teeth sections; a preselected pair of each spanned predetermined teeth sections having apertures therein, with said apertures being in spaced relation with the terminations of the preselected teeth sections to form a high reluctance path between the bore and the yoke section through said preselected teeth sections; and said preselected teeth sections being spaced away from the associated coil group axis in the direction of rotation for the revolvable member.

References Cited

UNITED STATES PATENTS

| | | | |
|---|---|---|---|
| 2,125,309 | 8/1938 | Oswald | 310—172 |
| 2,810,846 | 10/1957 | Hammerstrom | 310—172 |
| 3,207,935 | 9/1965 | Mosovsky | 310—172 |
| 3,235,761 | 2/1966 | Nohen | 310—192 |

J. D. MILLER, *Primary Examiner.*

L. L. SMITH, *Assistant Examiner.*

U.S. Cl. X.R.

310—192